United States Patent
Muendel

(10) Patent No.: US 7,746,914 B2
(45) Date of Patent: Jun. 29, 2010

(54) WAVEGUIDE RETROREFLECTOR AND METHOD OF FABRICATING THE SAME

(75) Inventor: Martin H. Muendel, Oakland, CA (US)

(73) Assignee: JDS Uniphase Corporation, Milpitas, CA (US)

(*) Notice: Subject to any disclaimer, the term of this patent is extended or adjusted under 35 U.S.C. 154(b) by 64 days.

(21) Appl. No.: 12/015,377

(22) Filed: Jan. 16, 2008

(65) Prior Publication Data

US 2009/0180511 A1 Jul. 16, 2009

(51) Int. Cl.
*H01S 3/08* (2006.01)
(52) U.S. Cl. .............................. 372/99; 372/92; 385/31; 264/1.24; 427/163.4
(58) Field of Classification Search .................. 372/99, 372/92; 385/31; 264/1.24; 427/163.4
See application file for complete search history.

(56) References Cited

U.S. PATENT DOCUMENTS

| 5,422,645 | A  | * | 6/1995  | Nettleton et al. ............... 342/45 |
| 6,014,389 | A  |   | 1/2000  | Wiest |
| 6,488,414 | B1 | * | 12/2002 | Dawes et al. .................... 385/79 |
| 7,088,756 | B2 |   | 8/2006  | Fermann et al. |
| 7,106,928 | B2 |   | 9/2006  | Dykaar |
| 7,190,511 | B2 |   | 3/2007  | Galvanauskas et al. |
| 7,260,299 | B1 |   | 8/2007  | Di Teodoro et al. |
| 2004/0218635 | A1 |   | 11/2004 | Schlueter |
| 2006/0132904 | A1 |   | 6/2006  | Galvanauskas |
| 2007/0172174 | A1 |   | 7/2007  | Scerbak |

FOREIGN PATENT DOCUMENTS

WO    WO 2007006317 A2 *  1/2007

OTHER PUBLICATIONS

Wang et al., "Retroreflective Properties of a Hemispherical Surface", Aug. 1, 1993, Applied Optics, vol. 32, No. 22, 4279-4281.*

* cited by examiner

*Primary Examiner*—Minsun Harvey
*Assistant Examiner*—Joshua King
(74) *Attorney, Agent, or Firm*—Matthew A. Pequignot; Pequignot + Myers LLC

(57) ABSTRACT

A waveguide retroreflector consists of an end cap with curved output surface attached to a waveguide such as optical fiber. The radius of curvature of the output surface of the end cap matches the length of the end cap so as to retro-reflect a substantial portion of radiation exiting the waveguide, back into the waveguide. A method of fabricating the waveguide retroreflector includes steps of splicing an end cap to a waveguide, heating the free flat surface of the end cap, so that surface tension changes the shape of the end cap to a convex shape due to surface tension, monitoring amount of light reflected off the surface being heated, and stopping applying the heat when the amount of the reflected light approaches a maximum value.

25 Claims, 4 Drawing Sheets

WAVEGUIDE RETROREFLECTOR AND METHOD OF FABRICATING THE SAME

FIELD OF THE INVENTION

The invention relates to fiber lasers, and more specifically, to fiber laser cavity mirrors that provide a region for beam expansion, as well as a surface for retroreflection of at least a portion of the laser radiation.

BACKGROUND OF THE INVENTION

A fiber laser resonator cavity has a reflector at each end of a length of an optical fiber that includes a doped core surrounded by one or more cladding layers. Generally, one reflector is a high reflector, having a reflectivity of close to 100% at the lasing wavelength, and the other reflector serves as the output coupler and typically has a reflectivity between 0.5% and 50% at the lasing wavelength. Reflectors can be formed by simply cleaving or polishing the ends of the fiber near perpendicular to the fiber axis and, if necessary, applying a coating to achieve a desired reflectivity. In most fiber lasers the desired output-coupler reflectivity is in the 1-10% range. The precise value has insignificant impact on the fiber laser performance; therefore, one very inexpensive, robust, and frequently-used option for the output coupler is to utilize the normal-incidence Fresnel reflectivity of the uncoated surface of around 4%, depending upon the refractive index of the fiber core.

In fiber lasers operating at high average power or high peak power, it can be deleterious for the unexpanded beam from the fiber core to impinge directly on the fiber end surface, whether coated or uncoated. Most often, the fiber core has a diameter between 5 microns and 30 microns, with a correspondingly small surface area; therefore at power levels of hundreds of Watts, the power density can approach 1 $GW/cm^2$, which is near the damage threshold of most fiber materials such as silica, particularly in the event of any slight surface imperfection or contamination.

A common technique to reduce this high power density at a fiber end is to splice a short length of coreless fiber or rod onto the fiber end. Such a short length of fiber or rod is often referred to as a fiber end cap or a beam expander. In operation a beam emitted from the fiber core, upon entering the end cap, ceases to be confined and expands as it traverses the end cap, exiting through the end cap surface with an increased beam diameter and correspondingly lower power density. Typically the end cap is 0.1-5 millimeters long and increases the beam diameter up to 50-300 microns. Since the power density scales as the inverse square of the beam diameter, a 5-10 times increase in diameter will lower the power density by a factor of 25-100 times, greatly improving the reliability of the fiber tip.

In order to operate a fiber laser at high power levels with one or more fiber-end reflectors, either coated or uncoated, it would be desirable to incorporate a fiber end cap into the fiber end in order to reduce the power density. However, it is neither sufficient nor practicable to simply attach a conventional end cap to a reflective flat output surface. Indeed, the reflected light in this case would continue to expand as it passes back through the end cap, and the beam would not be coupled efficiently back into the fiber core.

For example, if for an output coupler end cap, a 10% reflective surface is used with 5% coupling efficiency, then 0.5% of the light incident on the end cap surface will be reflected and fed back into the oscillator, 9.5% of the light will be reflected and lost, and 90% of the light will be transmitted. For typical applications, the coupled fraction of the backreflected light should be at least 4-5%, otherwise the system would have insufficient feedback. Thus, the application of prior art end caps as output couplers for a high power fiber laser is inefficient resulting in a considerable amount of wasted light and poorly controlled lasing due to insufficient feedback.

An external bulk optic mirror can be used as an output coupler in a fiber laser. However, such a mirror has to be aligned with a high precision in angular, as well as in linear sense; moreover, the high accuracy of alignment would have to be maintained over the operational temperature range of the laser. A high degree of alignment stability is difficult to achieve, especially in high power lasers which generate large temperature gradients during normal operation. Moreover, when an external output coupler, such as an external concave mirror, is used for providing feedback into the fiber laser, there is an additional interface that the light has to go through in order to reflect off that external coupler and couple back into the fiber. Such an interface would exhibit a potential point of failure due to high optical power densities at the interface as has been explained above. Therefore, it is preferable that an output coupler of a fiber laser has no air gaps, or voids, for the laser light to go through in its way from the fiber core towards the output coupler reflective surface; ideally, the output coupler would have to be bonded to the fiber directly, such that the laser light does not encounter a significant change of the index of refraction as it travels from the fiber core and towards the output coupler reflective surface.

Further, in some of prior art applications of beam expanders, an output surface of an end cap is sometimes lensed, so as to collimate the output beam exiting a fiber. However, such a fiber collimator is not practical as an output coupler because, in order for a lensed surface to collimate a diverging optical beam through refraction, a nonzero, or non-normal angle of incidence of a ray onto said surface is required; therefore, a ray reflected off such a surface would be deviated from going back, such that the entire reflected beam would be defocused upon retroreflection and, therefore, would not couple back into fiber with a required efficiency.

It is an object of this invention to provide a monolithic end cap that will ensure that a sufficient fraction of the radiation reflected from the output surface of the end cap is coupled back into the fiber core.

It is also an object of the invention to provide an end cap with an efficiency that would couple at least 50% of the backreflected light back into the fiber core. This high coupling efficiency is achieved without having to rely on often difficult and tedious alignment of external optical elements. Prior to this invention, it would have been very difficult to achieve the required precision in transverse, longitudinal, and angular alignment of an external bulk optic mirror to achieve efficient coupling of the reflected light back into the laser core.

It is also an object of the invention to provide a method which incorporates an efficient reflector onto the end surfaces of a fiber end cap using conventional equipment in a novel way.

The method, which will be described in more detail below, has additional benefit of yielding a surface that is extremely clean and free of micro-cracks and other defects typical of a surface prepared by conventional processes such as polishing or cleaving.

SUMMARY OF THE INVENTION

In accordance with the invention there is provided a waveguide retroreflector, comprising:

an optical waveguide having an end face;

an optical element bonded to said optical waveguide end face, wherein the optical element is substantially free of voids and/or air spaces in a light transmitting region thereof, wherein said light transmitting region of the optical element has a length along a direction of light propagation in said region;

wherein the optical element has a convex end face having a radius of curvature at an end of the light transmitting region;

wherein said radius of curvature is between 80% and 120% of the length of the light transmitting region of the optical element, such that at least 5% of a light reflected from said convex end face is coupled back into the optical waveguide.

In accordance with the invention there is further provided a method for fabricating a waveguide retroreflector, comprising:

providing an end cap affixed to an optical waveguide, wherein said end cap contains substantially homogeneous material, wherein said end cap has a length between two first and second opposing and substantially flat end faces, and wherein the first end face is fused to an end of said waveguide;

irradiating a second end of the waveguide with light such that the light is transmitted by the waveguide into the end cap;

measuring a fraction of said light reflected from the second end face of the end cap and coupled back into the waveguide;

applying sufficient amount of heat to said second end face, so that surface tension changes the shape of the flat second end face so as to form a convex shaped end having a radius of curvature;

repeating steps c) and d) until the radius of curvature of said convex shape becomes between 80% and 120% of the length of the end cap;

g) wherein proximity of said radius of curvature to said length of the end cap is determined from the value of said fraction of light, as compared to a maximum value of said fraction of light.

In accordance with another aspect of the invention there is provided a fiber laser resonator cavity, comprising:

an optical waveguide, having: first, an active section, and second, an end face;

an optical element bonded to said end face of the optical waveguide;

wherein the optical element is substantially free of voids and/or air spaces in a light transmitting region thereof;

wherein the optical element has an end face located at an end of the light transmitting region;

wherein said end face of the optical element is shaped to be perpendicular to the ray fan of a light emitted by the active section of the optical waveguide, said light impinging onto the end face of the optical element after having passed through the light transmitting region thereof.

BRIEF DESCRIPTION OF THE DRAWINGS

Exemplary embodiments of the invention will now be described in accordance with the drawings, in which:

FIGS. 1A and 1B are schematic views of a prior-art fiber laser resonator cavity, wherein FIG. 1A is a cross section taken along the line A-A through FIG. 1B;

DETAILED DESCRIPTION OF THE INVENTION

Figure 1A:
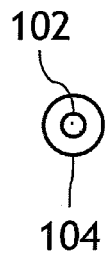

Referring to FIG. 1A a prior art optical fiber, having a core 102 and cladding 104, is shown. FIG. 1A is a cross section taken along the line A-A through FIG. 1B.

Figure 1B:
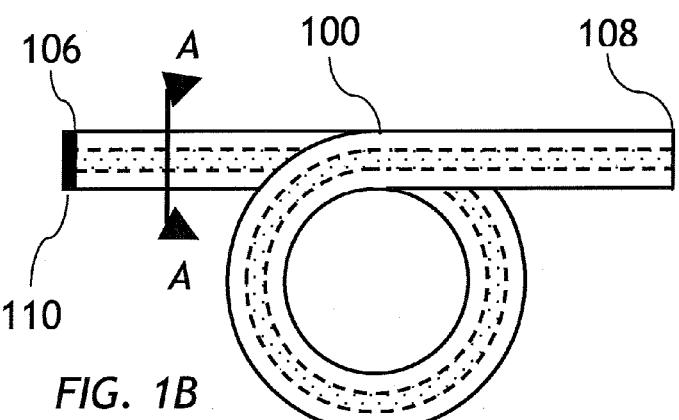

Referring to FIG. 1B a prior art fiber laser cavity is shown wherein an optical fiber 100 is cleaved at ends 106 and 108. A high reflector coating 110 is applied to the end 106, and the end 108 is left uncoated.

Figure 2:
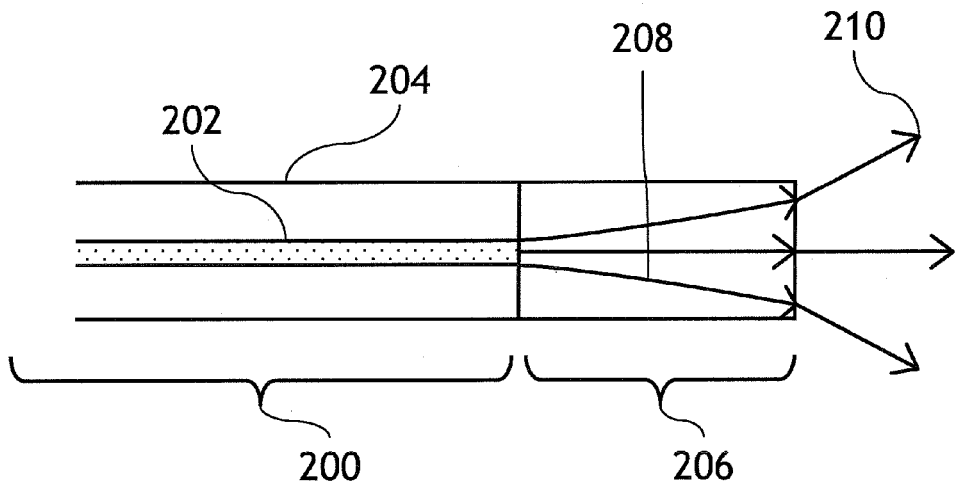
FIG. 2 is a schematic view of a prior-art fiber end cap.

Referring to FIG. 2 a prior art fiber end cap is shown consisting of a fiber section 200 and end cap section 206. The fiber section 200 consists of a fiber core 202 and fiber cladding 204. An expanding optical beam 208 propagates inside the end cap section 206. In operation, the optical beam 208 exits the end cap section 206 and continues to propagate in free space, as is schematically illustrated by arrows 210.

Figure 3A:
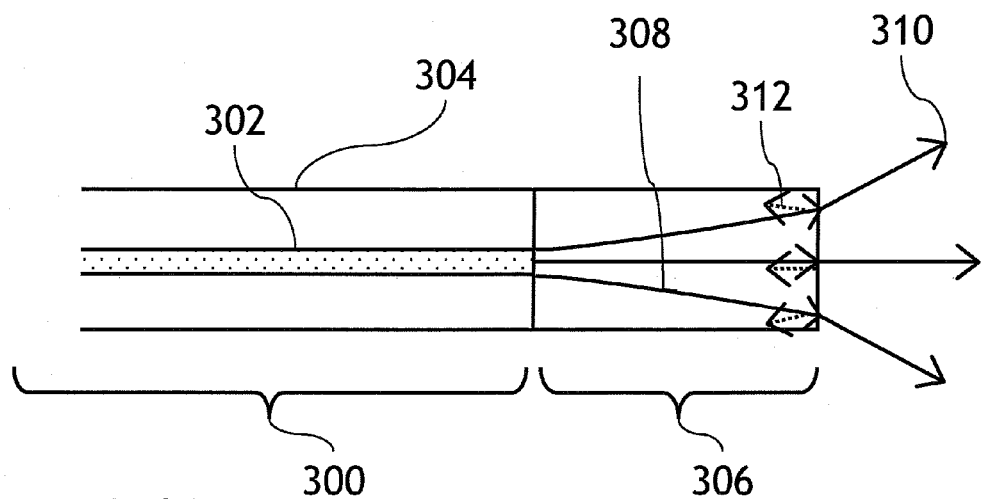
FIG. 3A is a schematic view of beam propagation and retroreflection in a prior-art fiber end cap with flat output surface.

FIG. 3A illustrates a prior art fiber laser output coupler consisting of a fiber section 300 and an end cap section 306. The fiber section 300 consists of fiber core 302 and fiber cladding 304. An expanding optical beam 308 propagates inside the end cap section 306. The optical beam 308 splits at the end of the end cap section 306 into outwards propagating beam 310 and retroreflected diverging beam 312.

Figure 3B:
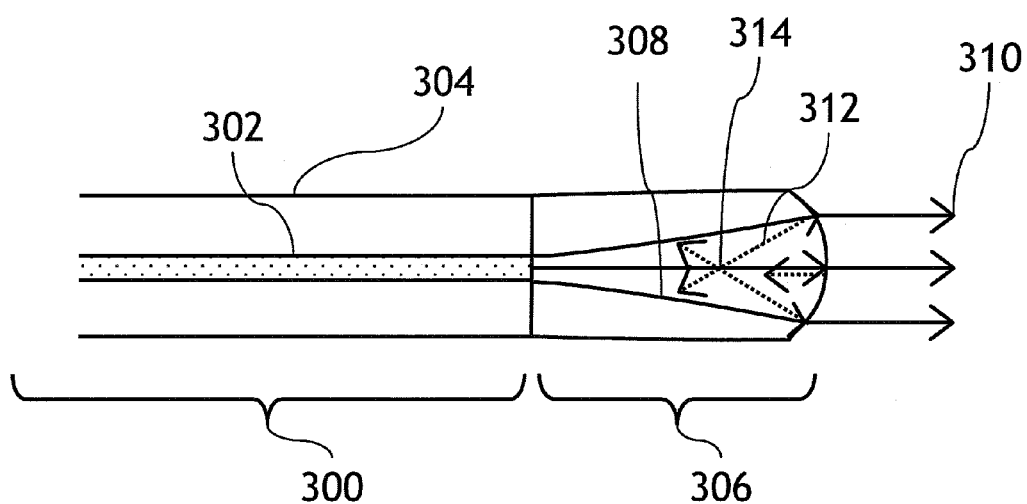
FIG. 3B is a schematic view of beam propagation and retroreflection in a prior art end-cap beam collimator.

In FIG. 3B a prior art fiber collimator is shown wherein a fiber section 300 consists of fiber core 302 and fiber cladding 304. An end cap section 306 contains an expanding optical beam 308. The optical beam 308 splits at the end of the end cap section 306 into outwards propagating collimated beam, represented by parallel lines 310, and quickly converging retroreflected beam 312 which propagates through intermediate focus 314 and diverges before reaching fiber section 300.

Figure 4A:
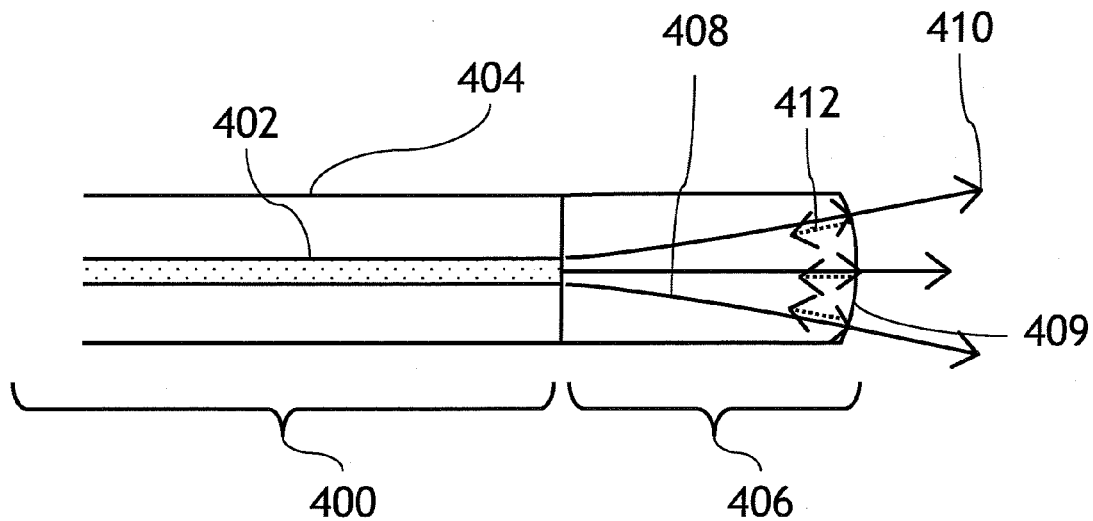
FIG. 4A is a schematic view of waveguide retroreflector of present invention.

Turning now to FIG. 4A a waveguide retroreflector of the present invention is shown having a waveguide section 400 and end cap section 406. The waveguide section 400 has a core 402 and cladding 404. In operation, an expanding optical beam 408 propagates inside the end cap section 406. The sections 400 and 406 can be bonded together using a variety of methods, such as splicing, fusing, glass soldering, epoxying, optical contacting, or other methods known to those skilled in the art. Whichever method of bonding is used, it is important that sections 400 and 406 are joined directly, i.e. without a spacer or other external structure leaving an air gap in the light transmitting region between sections 400 and 406. Fusing is a preferable bonding method because of its high yield, low cost, and lack of external bonding materials such as epoxy or glass solder, in the light transmitting region between sections 400 and 406.

During normal operation, the optical beam propagating within the waveguide 400 splits at the convex end surface 409 of the end cap section 406 into the outwards propagating beam 410 and the retroreflected converging beam 412, such that a sufficient fraction of the reflected radiation, for example at least 5%, is coupled back directly into the fiber core. The curved convex end surface 409 can be coated or uncoated, depending on whether the uncoated reflectivity of about 4% is adequate for the user's needs.

By way of example, using typical values, if the fiber core 402 has a diameter of 15 microns and a numerical aperture (NA) of 0.07, and the laser wavelength is 1.1 microns, it can be calculated that a 1.5 mm long fused silica end cap 406 will expand the beam diameter from 15 microns to 98 microns. This represents an increase in cross-sectional area of 43×, which greatly improves the reliability of the end cap 406 as desired. In order to couple the laser beam efficiently back into the core 402, the output surface of the end cap 406 should be approximately spherical with a radius of curvature slightly longer than the length of the end cap, specifically 1.54 mm. The precision of this radius of curvature relative to the end cap length must be +/−0.12 mm in order for the reflected beam to focus within one Rayleigh range of the fiber core, at which point approximately 50% of the reflected beam will overlap with the fiber core and can be coupled thereinto. By contrast, if a flat output surface is used, as is shown in prior art FIG. 3A, the beam diameter will expand to 194 microns at the point where it returns to the fiber core 302, and approximately 0.6% of the beam will overlap with the core 302 resulting in very poor coupling.

In order to couple the reflected light into the core efficiently, it is also important to control the centration (or equivalently the angular orientation) of the curved output surface 409. The splice between the laser fiber 400 and the end cap 406 is one factor that will affect the centration of the output surface. This splice can typically be made with a centration of +/−1 micron, which will create a displacement of +/−2 microns in the reflected beam, and an angle of +/−1.5 milliradian, resulting in a displacement of +/−5 microns in the reflected beam. Since both of these displacements are small compared to the core diameter of 15 microns, it can be seen that current splicing technology is adequate to generate the desired high coupling efficiency.

The centration with which the curved output surface 409 is fabricated is similarly important. It is preferably centered to a precision of +/−4 microns or more in order to provide a displacement of +/−8 microns or more at the fiber core 402, which is required for efficient coupling. Equivalently, the angular orientation is preferably controlled within +/−2.7 milliradian. In this manner, efficient coupling can be achieved.

Figure 4B:
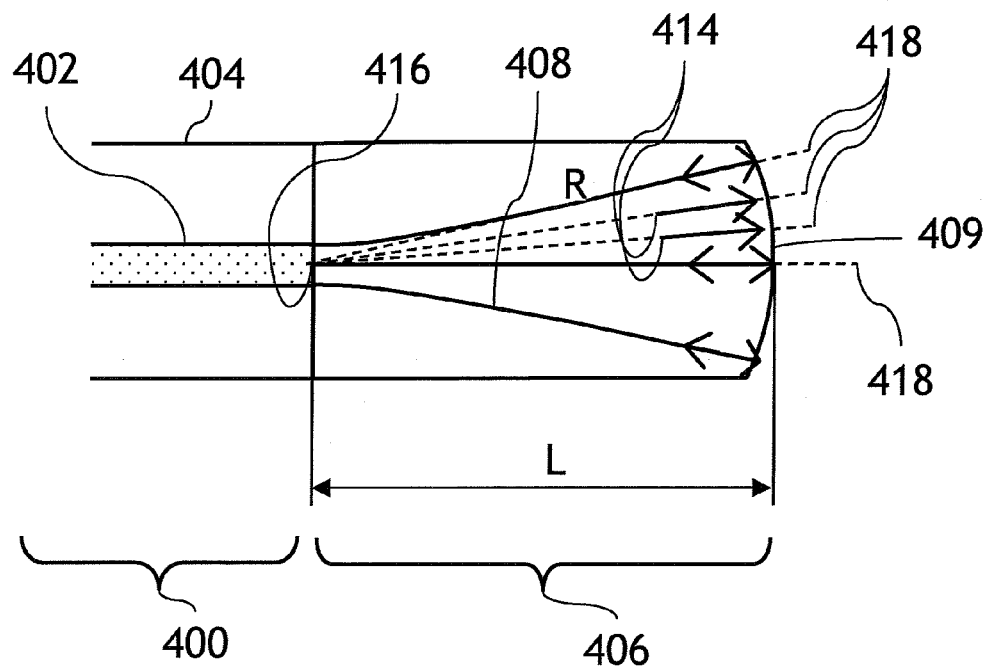
FIG. 4B is a diagram for illustrating relationship between length and radius of curvature of output surface of the waveguide retroreflector of present invention.

Referring now to FIG. 4B a relationship between the length L of the end cap section 406 and radius of curvature R of the end cap output surface 409 is further illustrated, such that a critical difference from the prior art collimator, shown in FIG. 3B, can be better understood. The waveguide section 400 consists of core 402 and cladding 404. The expanding optical beam 408 propagates inside the end cap section 406. The rays 414 of the beam 408, when continued backwards as straight lines, originate from substantially the same point 416 as is symbolically shown by dashed lines 418. The common point of origin 416 lies on axis of symmetry 418 of the end cap section 406. The concave surface 409 is arranged to be substantially perpendicular to rays 414 of the beam 408, such that, firstly, rays 414 will retrace backwards along their own respective paths, and secondly, substantially no refraction-caused deviation of output rays can occur. In order for the concave surface 409 to satisfy said requirement of perpendicularity to rays 414 over its area, it has to be spherical with center of the surface located at point 416. Furthermore, as it follows from the near-Gaussian nature of the expanding beam 408, the point 416, from which all the rays originate when projected backwards, or to the left from surface 409 as straight lines 418, is located close to the interface between waveguide section 400 and end cap section 406. Thus, the radius of curvature R should be approximately equal to the length L of the end cap section 406. In a preferred embodiment, the radius of curvature R differs from the length L by less than 20%, or $0.8L<R<1.2L$. This 20% difference accounts mostly for manufacturing tolerances.

Figure 5:
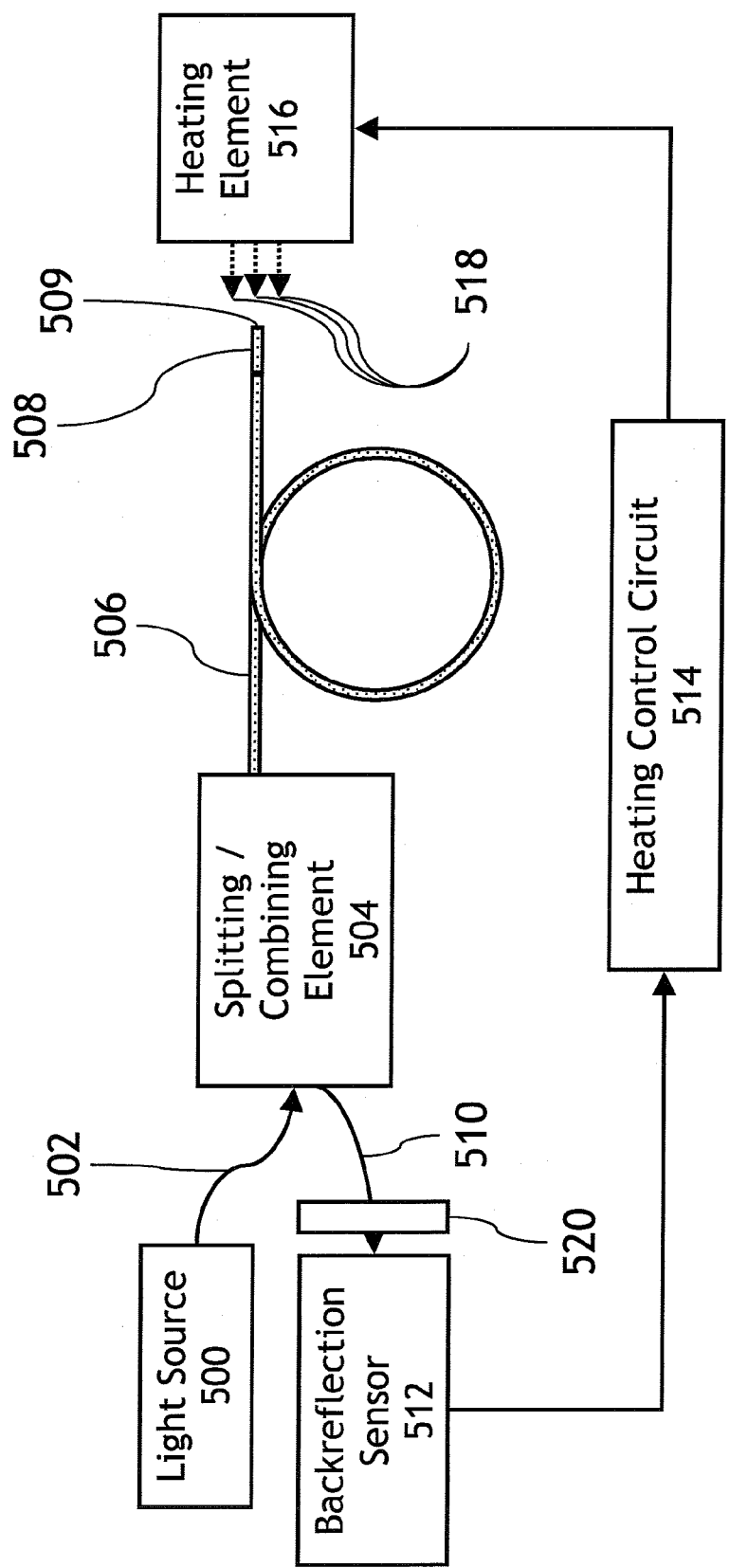
FIG. 5 is a block diagram illustrating a method of fabrication of said waveguide retroreflector.

Referring now to FIG. 5, a system, or a kit, for making the waveguide backreflector of the present invention is shown wherein a light source 500 is coupled to the input port 502 of a splitting/combining element 504. The function of said splitting/combining element 504 is to couple light from light source 500 into waveguide 506 through one of the two ends of the waveguide 506. An end cap 508 is attached to the other end of the waveguide 506. A light coupled into the waveguide 506 is reflected off the end surface 509 of the end cap 508, propagates back through the waveguide 506 and splitting/combining element 504, and is coupled, through its output port 510, to a backreflection sensor 512. The signal from the backreflection sensor 512 is applied to heating control circuit 514. The function of heating control circuit 514 is to control a heating element 516 for heating the surface 509 of the end cap 508. The dotted arrows 518 symbolize the heat provided by the heating element 516. FIG. 5 also shows optional filter 520 for rejecting thermal radiation generated by heated tip 509.

Splicing is perhaps the most convenient way of attaching end cap 508 to fiber 506. Preferably end cap 508 is a section of coreless fiber which is spliced onto the tip of the fiber 506 using techniques well established in the art. Further, this coreless fiber should preferably match the diameter of the glass cladding layer of the fiber 506 in order to ensure the good centration and angular alignment. Notwithstanding, with careful accurate splicing, or fusing, it is possible to get acceptable performance with mismatched fibers as well.

The coreless fiber is cleaved at normal incidence at the desired length of the end cap 508. It is difficult to control the cleaved length precisely using current typical cleaving technology, wherein the cleave position can be controlled to about +/−0.1-0.2 mm. Because the length of the end cap 508 will not necessarily be known to within +/−0.12 mm, using the values from the above typical example, the radius of curvature of the output surface 509 will likely need to be individually tailored to the length of the end cap 508.

The cleaving process generally provides an extremely flat and clean surface that can be aligned within 2 milliradians of normal to the fiber axis. The desired curved surface with a well controlled radius of curvature is formed by heating the end cap tip 509 until the material is softened sufficiently that surface tension causes the tip to become rounded. The heat, represented by arrows 518, may be generated from a variety of sources including a flame, an arc, a laser, or an electric filament such as that used in fusion splicers manufactured by the Vytran Corporation of New Jersey. The heating should preferably be very uniform and well controlled, and it may be desirable for the fiber end cap 508 to be oriented vertically in order to avoid distortion of the softened tip 509 by gravity. Under these circumstances, surface tension generates a very precisely and uniformly curved end surface.

As the fiber end surface 509 is heated and softened and begins to take on a curved shape, increasing amounts of light reflected by the output surface 509 will be focused back into the fiber core, and the backreflected signal will be seen to increase. Eventually, when the radius of curvature of the output surface 509 approximately equals the length of end cap 508, as explained above, a maximum amount of backreflection will be observed, and thereafter as the curvature of the end surface 509 continues to increase, the backreflected signal will begin to lessen. An algorithm for monitoring the backreflected signal and for controlling the heating element 516 may be provided; for example, the algorithm may control the turning off the heating element 516 as the backreflected signal approaches a desired level, which may equal the maximum level or any level less than the maximum. Note that the actual amount of curvature is very small; in the above example of a 1.5 mm long end cap 508, if the outer diameter of the end cap 508 is 400 micron, then the amount of "sag" required at the edges relative to the center of the surface 509, assuming a spherical shape of surface 509, is only about 9 microns. Therefore very little softening of the glass is required, and the heating temperature will be moderate.

Preferably, the control software built into heating control circuit 514 should take into account that the fiber tip 509 will not cool instantly, and will therefore continue to deform briefly, after the heating element 516 is turned off. It can control for fiber-to-fiber variations, for example, in splice centration or end-tip angle, which would affect the lateral position of the focused reflection relative to the fiber core; these variations would manifest themselves in differing rates of increase of the reflected signal level as the tip 509 is heated, and the algorithm could take account of the measured rate in order to optimize the time at which to, for example, turn off the heating element 516. A number of other variations of the heating algorithm can be provided; for instance, it may be desirable to cycle the heater 516 on and off repeatedly during the shaping of the fiber tip 509 in order to prevent it from heating too deeply or reaching too high a temperature. It is also important that the light source 500 and backreflection monitor system be designed with adequate signal-to-noise ratio; for example, the light source 500 should be of adequate power, and an optical filter 520 may be useful at the backreflection monitor, in order to overcome the infrared radiation generated by the heated fiber tip 509.

What is claimed is:

1. A waveguide retroreflector, comprising: an optical waveguide having an end face; an optical element bonded to said optical waveguide end face, wherein the optical element is substantially free of voids and/or air spaces in a light transmitting region thereof, wherein said light transmitting region of the optical element has a length along a direction of light propagation in said region; wherein the optical element has a convex end face having a radius of curvature at an end of the light transmitting region; wherein said radius of curvature is between 80% and 120% of the length of the light transmitting region of the optical element, such that at least 5% of a light reflected from said convex end face is coupled back into the optical waveguide.

2. A waveguide retroreflector of claim 1, wherein the optical element is fused to the end face of the optical waveguide.

3. A waveguide retroreflector of claim 1, further comprising a thin film coating applied to the convex end face of the optical element, for modifying reflection coefficient of said end face.

4. A waveguide retroreflector of claim 3, wherein said thin film coating has a reflectivity between 1% and 5%.

5. A waveguide retroreflector of claim 3, wherein said thin film coating has a reflectivity between 5% and 25%.

6. A waveguide retroreflector of claim 3, wherein said coating has a reflectivity between 25% and 100%.

7. A waveguide retroreflector of claim 2, wherein said optical element is a coreless section of fiber having a diameter between 95% and 105% of diameter of said optical waveguide.

8. A waveguide retroreflector of claim 7, further comprising a thin film coating applied to the convex end face of the optical element.

9. A waveguide retroreflector of claim 8, wherein said coating has a reflectivity between 1% and 5%.

10. A waveguide retroreflector of claim 8, wherein said coating has a reflectivity between 5% and 25%.

11. A waveguide retroreflector of claim 8, wherein said coating has a reflectivity between 25% and 100%.

12. A fiber laser resonator cavity, comprising: an optical waveguide having an active section for light amplification; a waveguide retroreflector of claim 1 fused to said optical waveguide.

13. A fiber laser resonator cavity, comprising: an optical waveguide having an active section for light amplification; a waveguide retroreflector of claim 3 fused to said optical waveguide.

14. A fiber laser resonator cavity, comprising: an optical waveguide having an active section for light amplification; a waveguide retroreflector of claim 7 fused to said optical waveguide.

15. A fiber laser resonator cavity, comprising: an optical waveguide having an active section for light amplification; a waveguide retroreflector of claim 8 fused to said optical waveguide.

16. A method for fabricating a waveguide retroreflector, comprising: a) providing an end cap affixed to an optical waveguide, wherein said end cap contains substantially homogeneous material, wherein said end cap has a length between first and second opposing and substantially flat end faces, and wherein the first end face is fused to an end of said waveguide; b) irradiating a second end of the waveguide with light such that the light is transmitted by the waveguide into the end cap; c) measuring a fraction of said light reflected from the second end face of the end cap and coupled back into the waveguide; d) applying sufficient amount of heat to said second end face, so that surface tension changes the shape of the flat second end face so as to form a convex shaped end having a radius of curvature; e) repeating steps c) and d) until the radius of curvature of said convex shape becomes between 80% and 120% of the length of the end cap; wherein proximity of said radius of curvature to said length of the end cap is determined from the value of said fraction of light, compared to a maximum value of said fraction of light.

17. A method for fabricating a waveguide retroreflector of claim 16, wherein the end cap is oriented vertically with respect to gravity in order to avoid distortion of the softened second end face by said gravity.

18. A method for fabricating a waveguide retroreflector of claim 16, wherein a thermal inertia of the end cap is accounted for by measuring a rate of change of the fraction of light, and stopping applying the heat before the fraction of light reaches its maximum, as to account for said thermal inertia of the end cap.

19. A method for fabricating a waveguide retroreflector of claim 16, wherein: an effect of thermal inertia of the end cap is minimized by applying said heat in short bursts having a burst duration time; wherein the burst duration time is smaller than a time of continuous heat application, required to soften the end face of the end cap as to form the convex shaped end.

20. A method for fabricating a waveguide retroreflector of claim 16, further providing a step of filtering out infrared radiation, generated by the heated second face of the end cap, such that said thermal radiation does not affect the measurement of said fraction of light.

21. A method for fabricating a waveguide retroreflector of claim 16, wherein measuring of said fraction of light is performed by using a photodiode.

22. A method for fabricating a waveguide retroreflector of claim 16, further comprising separating the light irradiating the second end face from the light reflected from said end face by using a fiber splitter/coupler.

23. A method for fabricating a waveguide retroreflector of claim 16, further comprising separating the light irradiating the second end face from the light reflected from said end face by using a fused fiber splitter/coupler.

24. A method for fabricating a waveguide retroreflector of claim 16, further comprising separating the light irradiating the second end face from the light reflected from said end face by using a fiber coupled circulator.

25. A fiber laser resonator cavity, comprising: an optical waveguide, having: first, an active section, and second, an end face; an optical element bonded to said end face of the optical waveguide; wherein the optical element is substantially free of voids and/or air spaces in a light transmitting region thereof; wherein the optical element has an end face located at an end of the light transmitting region; wherein said end face of the optical element is shaped to be perpendicular to the ray fan of a light emitted by the active section of the optical waveguide, said light impinging onto the end face of the optical element after having passed through the light transmitting region thereof.

* * * * *